(No Model.)
E. P. CHESBRO.
DEVICE FOR CRUSHING SUGAR, SALT, &c.
No. 252,738. Patented Jan. 24, 1882.
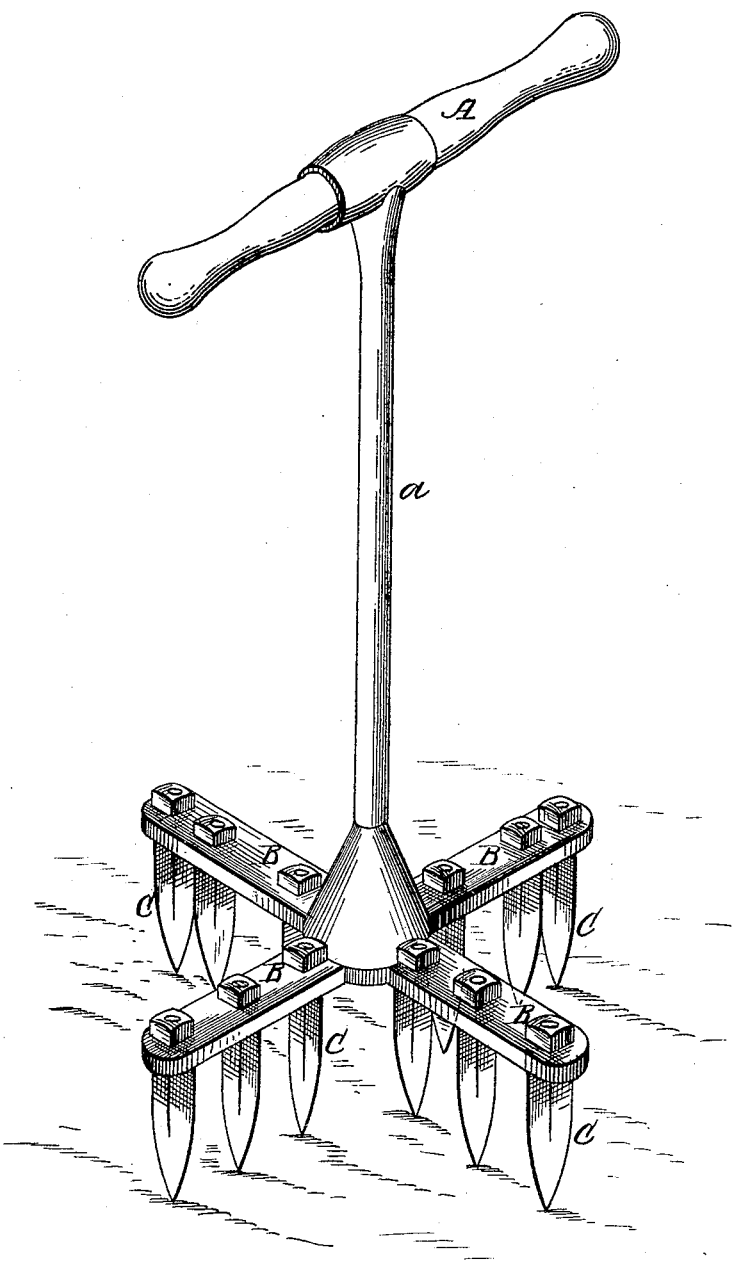
Witnesses.
F. L. Ourand
L. S. Miller
Inventor
Ernest P. Chesbro.
per Chas. H. Fowler,
Attorney

UNITED STATES PATENT OFFICE.

ERNEST P. CHESBRO, OF WILLIMANTIC, CONNECTICUT.

DEVICE FOR CRUSHING SUGAR, SALT, &c.

SPECIFICATION forming part of Letters Patent No. 252,738, dated January 24, 1882.

Application filed December 14, 1881. (No model.)

*To all whom it may concern:*

Be it known that I, ERNEST P. CHESBRO, a citizen of the United States, residing at Willimantic, in the county of Windham and State of Connecticut, have invented certain new and useful Improvements in Devices for Crushing Sugar, Salt, &c.; and I do hereby declare that the following is a full, clear, and exact description of the same, reference being had to the annexed drawing, making a part of this specification, and to the letters and figures of reference marked thereon.

The present invention has relation to certain new and useful improvements in devices for breaking up or crushing sugar, salt, chicory, sal-soda, and like crystals; and it consists in a device constructed substantially as shown in the drawing and hereinafter described.

In the accompanying drawing, which represents a perspective view of my invention, A designates the handle, connected horizontally or crosswise to a suitable shank, $a$. The shank $a$ at its lower end is formed with or has connected thereto radial arms B, which carry crushing blades or spikes C. These blades or spikes may be of any suitable size, form, and construction, so long as they will accomplish the object sought—that of crushing or breaking up the crystals by twisting or turning the device therein—the cross-handle A enabling great leverage power to be brought in turning the device when the spikes or blades are forced down into the crystals.

If desired, each of the blades may be formed with a screw-threaded shank for connecting them to the arms by suitable screw-nuts; or any other well-known means may be employed which will admit of the blades being removed when required.

Having now fully described my invention, what I claim as new, and desire to secure by Letters Patent, is—

A device for breaking up or crushing crystals, consisting of the spikes or blades C, formed with or connected to the arms B, in combination with the shank $a$ and a suitable handle, A, substantially as and for the purpose set forth.

In testimony that I claim the above I have hereunto subscribed my name in the presence of two witnesses.

ERNEST P. CHESBRO.

Witnesses:
SAMUEL CHESBRO,
EDGAR E. BASS.